(12) United States Patent
BenHanokh et al.

(10) Patent No.: US 11,245,762 B1
(45) Date of Patent: Feb. 8, 2022

(54) DATA REQUEST SERVICING USING SMART NETWORK INTERFACE CARDS

(71) Applicant: RED HAT, INC., Raleigh, NC (US)

(72) Inventors: Gabriel Zvi BenHanokh, Tel-Aviv (IL); Joshua Durgin, Canyon County, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/324,228

(22) Filed: May 19, 2021

(51) Int. Cl.
*H04L 29/08* (2006.01)
(52) U.S. Cl.
CPC .......... *H04L 67/1097* (2013.01); *H04L 67/32* (2013.01)
(58) Field of Classification Search
CPC .............................. H04L 67/1097; H04L 67/32
See application file for complete search history.

(56) References Cited

U.S. PATENT DOCUMENTS

| | | | | |
|---|---|---|---|---|
| 10,592,447 | B1* | 3/2020 | Danilov | G06F 12/0646 |
| 10,909,102 | B2 | 2/2021 | Wang et al. | |
| 2004/0117596 | A1* | 6/2004 | Henry | G06F 3/0683 711/221 |
| 2014/0351203 | A1 | 11/2014 | Kunnatur et al. | |
| 2019/0372804 | A1* | 12/2019 | Li | H04L 41/0803 |
| 2020/0278892 | A1 | 9/2020 | Nainar et al. | |
| 2020/0314011 | A1* | 10/2020 | Deval | H04L 69/22 |
| 2020/0351222 | A1* | 11/2020 | Zakin | H04L 49/9068 |
| 2020/0409873 | A1 | 12/2020 | Kamath et al. | |
| 2021/0026731 | A1* | 1/2021 | Li | G06F 3/0619 |
| 2021/0092058 | A1* | 3/2021 | Popilov | H04L 45/74 |
| 2021/0103403 | A1* | 4/2021 | He | G06F 3/0655 |
| 2021/0144517 | A1* | 5/2021 | Guim Bernat | G06F 11/3006 |
| 2021/0248124 | A1* | 8/2021 | Tobin | G06F 9/546 |

OTHER PUBLICATIONS

Liu, M., et al., "E3: Energy-Efficient Microservices on SmartNIC-Accelerated Servers," University of Washington, 2018, https://homes.cs.washington.edu/~arvind/papers/e3-smartic.pdf.
Grant, S., et al., "SmartNIC Performance Isolation with FairNIC: Programmable Networking for the Cloud," SIGCOMM '20, Aug. 10-14, 2020, Virtual Event, https://courses.engr.illinois.edu/ece598hpn/fa2020/papers/fairnic.pdf.
Macvittie, L., "Sharding for Scale: Architecture Matters," 2017, https://devops.com/sharding-scale-architecture-matters/.

* cited by examiner

*Primary Examiner* — Shean Tokuta
(74) *Attorney, Agent, or Firm* — Kilpatrick Townsend & Stockton LLP

(57) ABSTRACT

Data requests can be serviced by smart network interface cards (NICs). For example, a smart NIC can receive a request for data at a hardware-implemented path of the smart network interface card (NIC). The smart NIC can determine, based on a mapping table accessible by the hardware-implemented path of the smart NIC, a first storage node includes the data. The smart NIC can transmit the request to the first storage node for determining a second storage node, rather than the first storage node, includes the data and transmitting at least a portion of the request to the second storage node.

20 Claims, 3 Drawing Sheets

DATA REQUEST SERVICING USING SMART NETWORK INTERFACE CARDS

TECHNICAL FIELD

The present disclosure relates generally to smart network interface cards (NICs). More specifically, but not by way of limitation, this disclosure relates to data request servicing using smart NICs.

BACKGROUND

Smart network interface cards (NICs) are devices capable of offloading processes from a host processor in a computing environment. For example, a smart NIC can perform network traffic processing that is typically performed by a central processing unit (CPU). Other processes the smart NIC can perform can include load balancing, encryption, network management, and network function virtualization. Offloading functionality to a smart NIC can allow the CPU to spend more time performing application processing operations, thereby improving performance of the computing environment.

DETAILED DESCRIPTION

Figure 1:
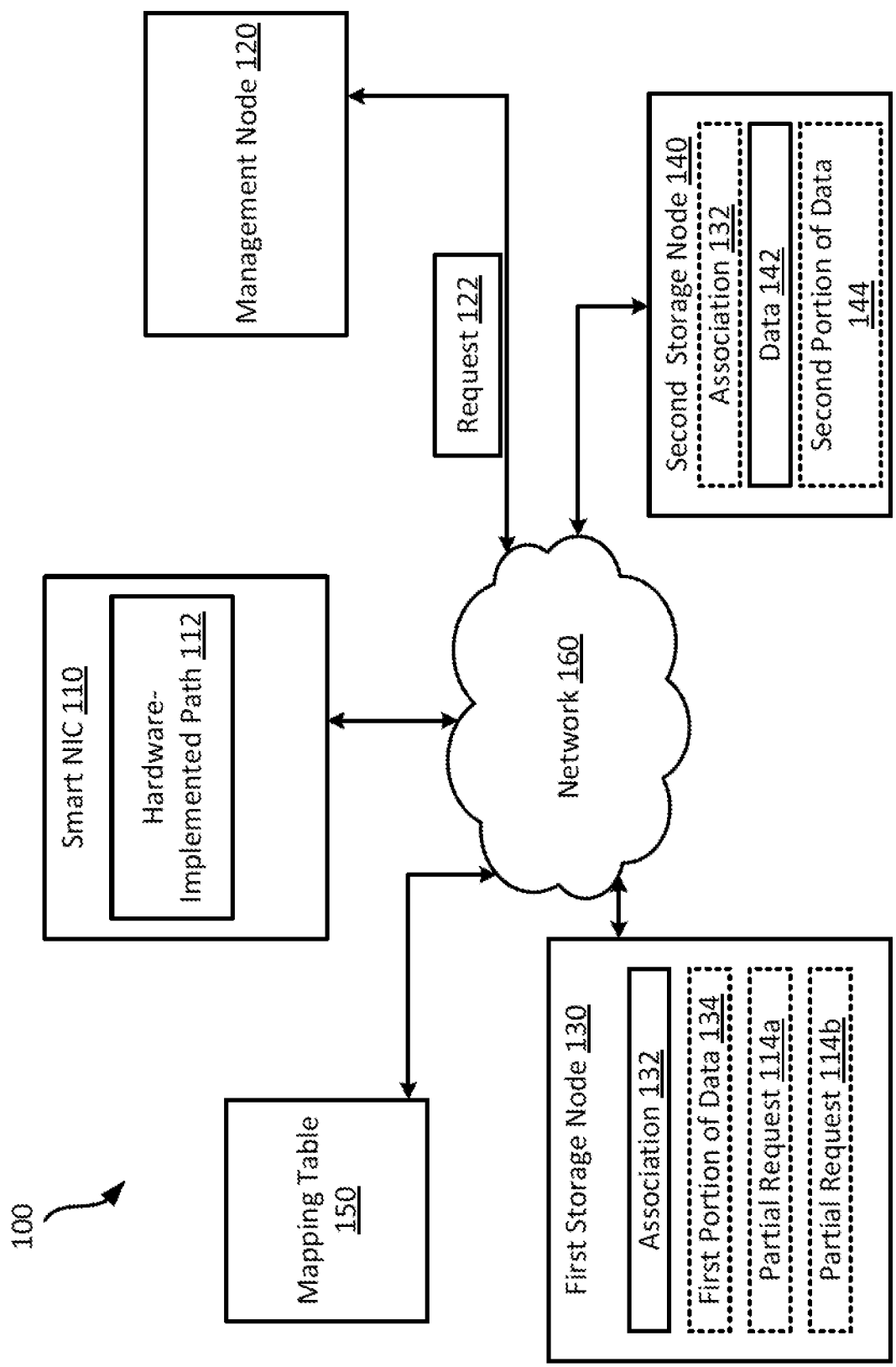
FIG. 1 is a block diagram of an example of a system for implementing data request servicing using smart network interface cards (NICs) according to some aspects of the present disclosure.

Smart network interface cards (NICs) can offload processes from a processor, such as transmitting data requests to storage nodes. A smart NIC may refer to a network interface card that is programmable. For example, a smart NIC can initially include unused computational resources that can be programmed for additional functionality. Smart NICs can include multiple paths for performing operations. One path of the smart NIC can be considered a fast path and can be a hardware-implemented path. The hardware may be a field-programmable gate array (FPGA) that can run dedicated simplified code that does not involve significant interaction with software. As a result, the hardware-implemented path may service input/output (I/O) requests quickly.

Another path can be considered a slow path that runs code on an embedded processor, such as an advanced reduced instruction set computer (RISC) machine (ARM). The second path can execute any type of code, but may be an order of magnitude slower than the hardware-implemented path. Smart NICs may use the second path, as opposed to the fast, hardware-implemented path, to service data requests since the slow path can interact with software to run more complex code. For instance, data may be sharded and distributed across multiple storage nodes of a system. Sharding code is often implemented at the application level, so the smart NIC has to interact with the applications to determine where to transmit the data requests. Since the fast path includes limited software interaction capabilities, sharding code may be too complex for the fast path, so the slow path may be used to service data requests. As a result, using a smart NIC to transmit data requests to storage nodes may be inefficient and time consuming.

Some examples of the present disclosure can overcome one or more of the abovementioned problems by providing a system including a smart NIC that can receive a request for data at a hardware-implemented path of the smart NIC. The smart NIC can use a mapping table to determine a first storage node that includes the data. The smart NIC can then transmit the request to the first storage node to perform a full validation of the request to route any part of the request for data that is not stored on the first storage node to the correct storage node. For example, the first storage node can determine a second storage node, rather than the first storage node, includes the data and then transmit at least a portion of the request to the second storage node. The hardware-implemented path quickly services the requests based on the mapping table, which can be periodically updated. The storage nodes can then verify the accuracy of the transmission of the request from the smart NIC using an association of data and data locations on the storage nodes. The association can be updated automatically in real time, such that the storage nodes can accurately redirect requests for data on a different storage node.

For data that is sharded and distributed across multiple storage nodes of the system, the smart NIC may transmit the request to a storage node that includes a portion of the data. The smart NIC may not differentiate sharded data from data that is not sharded. Typically, requests do not cross node boundaries, so the smart NIC can transmit the full request to one storage node without splitting the request into partial requests and transmitting the partial requests to multiple storage nodes. The storage node can generate partial requests for the other portions of the data on other storage nodes and transmit the partial requests to the other storage nodes. This may minimize decision making in the hardware-implemented path and result in efficient servicing of data requests in a reduced amount of time.

One particular example can involve system with a smart NIC and two storage nodes: storage node A and storage node B. The smart NIC can receive a request at a hardware-implemented path for data stored in storage node B. The hardware-implemented path can access a mapping table that indicates the data is stored in storage node A. The hardware-implemented path can then transmit the request for the data to storage node A based on the mapping table indicating the data is stored in storage node A. Storage node A can receive the request and verify whether storage node A includes the data. Storage node A can determine that storage node B includes the data, rather than storage node A, and transmit at least a portion of the request to storage node B. Storage node B can receive the portion of the request and retrieve the data. This can reduce the time for retrieving data and servicing requests using smart NICs.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing data request servicing using smart NICs according to some aspects of the present disclosure. The system 100 can include a smart NIC 110, a management node 120, a first storage node 130, a second storage node 140, and a mapping table 150. The first storage node 130 and the second storage node 140 can be physical servers for storing data. The smart NIC 110, the management node 120, the first storage node 130, the second storage node 140, and the mapping table 150 can communicate over a network 160, such as a local area network (LAN) or the Internet.

In some examples, the smart NIC 110 can include a hardware-implemented path 112 that is capable of running simplified code to execute I/O requests quickly. The hardware-implemented path 112 can be used for passthrough I/O requests that involve limited interaction with software. The hardware-implemented path 112 may be implemented as a field-programmable gate array (FPGA). The smart NIC 110 can receive a request 122 from the management node 120. The request 122 can be a request for data 142 stored in a storage node. For example, the request 122 may be a write request that the management node 120 receives from a client device (not shown). The management node 120 can transmit the request 122 to the hardware-implemented path 112.

In some examples, the hardware-implemented path 112 can access the mapping table 150 to determine a location of the data 142 of the request 122. The mapping table 150 can include an identification of the location of the data 142 within the system 100. For example, the hardware-implemented path 112 can use the mapping table 150 to determine the first storage node 130 includes the data 142. The smart NIC 110 can then transmit the request 122 to the first storage node 130.

To reduce computing requirements, the mapping table 150 may be updated periodically rather than continuously. For example, a data block may be stored in the first storage node 130 initially, but may be relocated to the second storage node 140 at some point in time. The mapping table 150 may not be automatically updated in response to the data block being relocated, but a predetermined event may trigger generation of an updated version of the mapping table 150. Examples of the predetermined event can be an elapsing of a predefined amount of time, such as twenty-four hours, or an addition of a storage node to the system 100. The management node 120 can determine an occurrence of a predetermined event, generate the updated version of the mapping table 150, and replace the mapping table 150 with the updated version.

Once the smart NIC 110 transmits the request 122 to the first storage node 130 in response to determining the first storage node 130 includes the data 142, the first storage node 130 can verify whether the data 142 is stored on the first storage node 130 or not. Location information for the data 142 of the request 122 may be transmitted along with the request 122 so that the first storage node 130 can perform the verification. In a non-volatile memory express over fabrics (NVMeoF) protocol, a data identifier associated with the data 142 and an offset can be included as first data in a write-buffer. For a read request, a namespace identifier and reserve fields of the NVMe read request can be used to describe the data identifier. For example, the namespace identifier may be bytes 04-07 and the reserved fields may be bytes 08-15. Additionally, the offset can overload the bytes used by the logical block addressing (LBA) offset (e.g., bytes 40-48).

Each storage node in the system 100 can store an association 132 between each storage node and data stored on each storage node. The management node 120 can automatically update the association 132 in real time when data is relocated or added to the system 100. Thus, the mapping table 150 may indicate data is stored on one storage node while the association 132 indicates the data is stored on a second storage node. For example, the mapping table 150 may indicate that the data 142 is stored in the first storage node 130, while the association 132 indicates the data 142 is stored on the second storage node 140. As a result, the first storage node 130 can determine the data 142 of the request 122 is stored on the second storage node 140. The first storage node 130 can transmit at least a portion of the request 122 to the second storage node 140. The second storage node 140 can receive the portion of the request 122, determine the second storage node 140 includes the data 142 based on the association 132, and retrieve the data 142 in the second storage node 140.

In some examples, data objects may be sharded across multiple storage nodes of the system 100. In other words, a data object may be fragmented into smaller pieces, and each piece can be stored on a different storage node. The data object may be fragmented across any number of storage nodes. In such examples, requests for data may also be fragmented, and the fragmentation may happen at a storage node.

To illustrate, the management node 120 can transmit the request 122 for data to the hardware-implemented path 112 of the smart NIC 110. The hardware-implemented path 112 can determine, based on the mapping table 150, that the first storage node 130 includes at least a portion of the data, and transmit the request 122 to the first storage node 130. The mapping table 150 may indicate each storage node that includes a portion of the data. For example, the smart NIC 110 can determine the first storage node 130 includes a first portion of the data 134 and the second storage node 140 includes a second portion of the data 144. The smart NIC 110 can transmit the request 122 to the first storage node 130 based on the mapping table 150 indicating the first portion of the data 144 is stored in the first storage node 130. The hardware-implemented path 112 may avoid further processing of the request 122 subsequent to transmitting the request 122 to the first storage node 130. For example, to minimize decision making at the hardware-implemented path 112, the hardware-implemented path 112 may avoid transmitting the request 122, or portions of the request 122, to each storage node that includes a portion of the data. Instead, the hardware-implemented path 112 may only send the request 122 to a single storage node with a portion of the data.

The first storage node 130 can receive the request 122 and determine the first storage node 130 includes the first portion of the data 134 and the second storage node 140 includes the second portion of the data 144. The first storage node 130 can then generate a first partial request 114a for the first portion of the data 134 and a second partial request 114b for the second portion of the data 144 from the request 122. The first storage node 130 can retrieve the first portion of the data 134 based on the first partial request 114a. The first storage node 130 can also transmit the second partial request 114b to the second storage node 140 and the second storage node 140 can retrieve the second portion of the data 144 based on the second partial request 114b.

FIG. 1 is illustrative and non-limiting. Other examples may include more components, fewer components, different components, or a different arrangement of the components shown in FIG. 1. For example, although the system 100 includes two storage nodes in the example of FIG. 1, the system 100 may include a larger number of storage nodes in other examples. Data objects may be distributed across any number of the storage nodes. Additionally, although not shown in FIG. 1, the mapping table 150 may be stored in a memory device, such as a cache memory.

Figure 2:
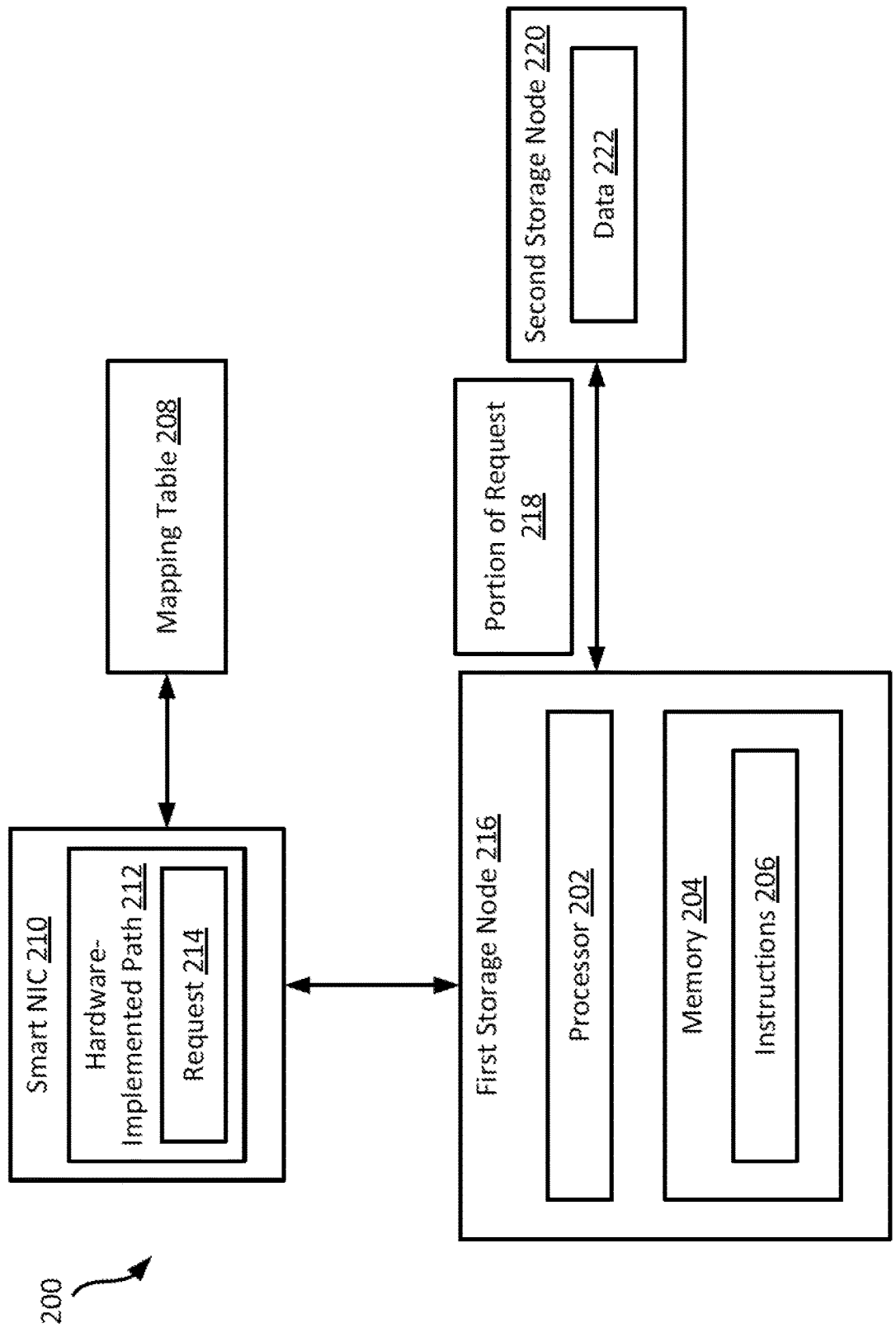
FIG. 2 is a block diagram of another example of system for implementing data request servicing using smart NICs according to some aspects of the present disclosure.

FIG. 2 is a block diagram of another example of a system 200 for implementing data request servicing using smart NICs according to some aspects of the present disclosure. The system 200 includes a smart NIC 210 with a hardware-implemented path 212, a first storage node 216, and a second storage node 220. The first storage node 216 includes processor 202.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206. Although not shown in FIG. 2, the second storage node 220 and the management node 120 of FIG. 110 may also each include a processor communicatively coupled with a memory that stores instructions that are executable by the processors.

In some examples, the smart NIC 210 can be configured to receive a request 214 for data 222 at the hardware-implemented path 212. The smart NIC 210 can determine, based on a mapping table 208 accessible by the hardware-implemented path 212, that the first storage node 216 includes the data 222 of the request 214. The smart NIC 210 can transmit the request 214 to the first storage node 216. The processor 202 can execute the instructions 206 to perform operations. For example, the processor 202 can receive the request 214 from the smart NIC 210 and determine a second storage node 220, rather than the first storage node 216, includes the data 222. The processor 202 can then transmit at least a portion of the request 218 to the second storage node 220. Servicing data requests on the hardware-implemented path 212 of the smart NIC 210 can reduce computation time and requirements of the system 200, resulting in improved performance and response to requests.

Figure 3:
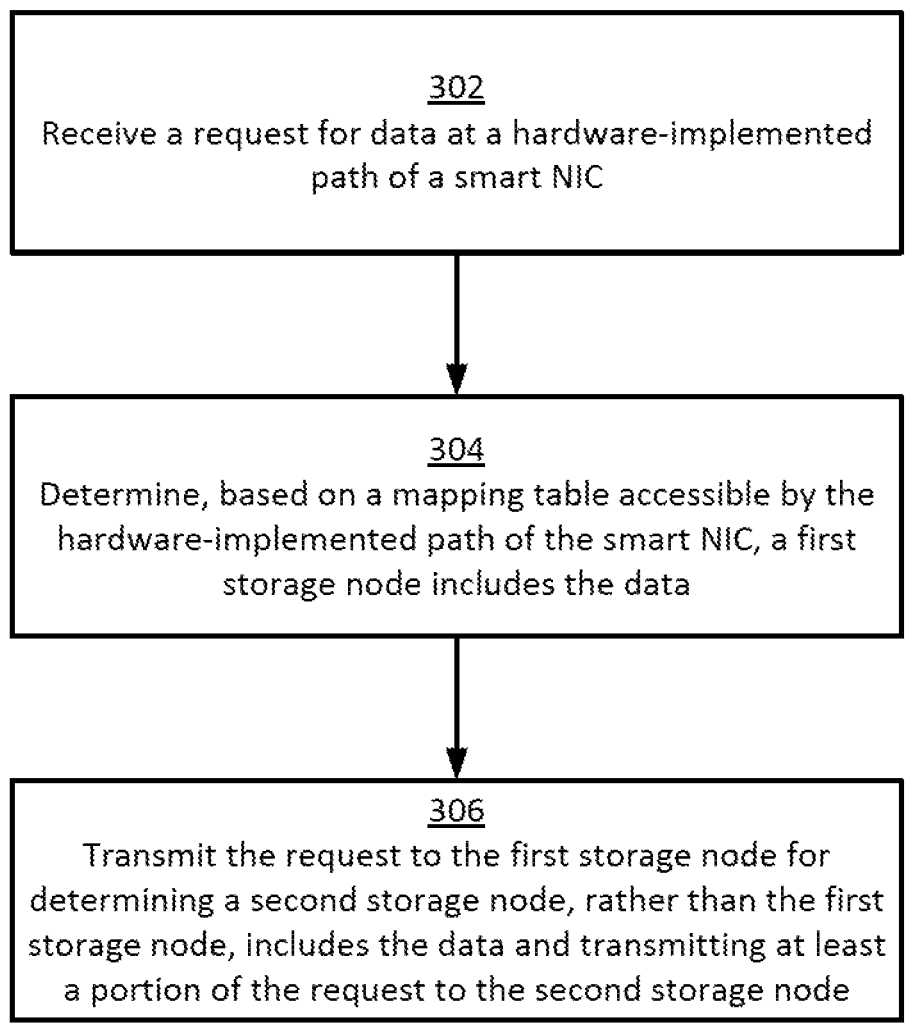
FIG. 3 is a flow chart of a process for servicing data requests using smart NICs according to some aspects of the present disclosure.

The smart NIC 210 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the smart NIC 210 can receive a request 214 for data 222 at a hardware-implemented path 212 of the smart NIC 210. The hardware-implemented path 212 can be a FPGA that is configured to execute simplified code in a shorter amount of time compared to an embedded processor of the smart NIC 210 that is capable of interacting with software to execute more complex code.

In block 304, the smart NIC 210 can determine, based on a mapping table 208 accessible by the hardware-implemented path 212 of the smart NIC 210, a first storage node 216 includes the data 222. The mapping table 208 can be updated periodically in response to predetermined events, so the mapping table 208 may not include an accurate mapping of data objects to locations of the data objects. Additionally, the smart NIC 210 may determine that the data 222 is distributed across multiple storage nodes based on the mapping table 208. The smart NIC 210 can then generate and transmit the request 214 to a storage node that includes a portion of the data 222.

In block 306, the smart NIC 210 can transmit the request 214 to the first storage node 216 for determining a second storage node 220, rather than the first storage node 216, includes the data 222 and transmitting at least a portion of the request 218 to the second storage node 220. The second storage node 220 can then retrieve the data 222 in response to the portion of the request 218. Alternatively, the first storage node 216 may receive the request 214 and determine the first storage node 216 and the second storage node 220 each include a portion of the data 222. The first storage node 216 can then generate the portion of the request 218 for the portion of the data 222 that is stored on the second storage node 220 and transmit the portion of the request 218 to the second storage node 220. The first storage node 216 and the second storage node 220 can retrieve the respective portions of the data 222 in response to the request 214 and the portion of the request 218. Using the hardware-implemented path 212 of the smart NIC 210 to quickly service requests and then verifying the accuracy of the transmission of the requests from the smart NIC 210 at the storage nodes may reduce a time for data retrieval.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
   receiving a request for data at a hardware-implemented path of a smart network interface card (NIC);
   determining, based on a mapping table accessible by the hardware-implemented path of the smart NIC, a first storage node includes the data; and
   transmitting the request to the first storage node for:
     determining a second storage node, rather than the first storage node, includes the data; and
     transmitting at least a portion of the request to the second storage node.

2. The method of claim 1, further comprising:
   determining, based on the mapping table, the first storage node includes a first portion of the data and the second storage node includes a second portion of the data; and
   transmitting the request to the first storage node.

3. The method of claim 1, further comprising accessing an updated version of the mapping table, wherein the updated version of the mapping table is generated subsequent to a predetermined event.

4. The method of claim 3, wherein the predetermined event comprises an addition of a storage node or an elapsing of a predefined amount of time.

5. The method of claim 1, further comprising transmitting the request to the first storage node for:

determining the first storage node includes a first portion of the data and the second storage node includes a second portion of the data;
generating, from the request, a first partial request for the first portion of the data and a second partial request for the second portion of the data; and
transmitting the second partial request to the second storage node.

6. The method of claim 1, further comprising transmitting the request to the first storage node for:
subsequent to transmitting the at least a portion of the request to the second storage node, determining the second storage node includes the data of the request; and
retrieving the data in the second storage node.

7. The method of claim 1, wherein the first storage node stores an association between each storage node and data stored on each storage node that is updated automatically in real time.

8. A non-transitory computer-readable medium comprising program code that is executable by a processor for causing the processor to:
receive a request for data at a hardware-implemented path of a smart network interface card (NIC);
determine, based on a mapping table accessible by the hardware-implemented path of the smart NIC, a first storage node includes the data of the request; and
transmit the request to the first storage node for:
determining a second storage node, rather than the first storage node, includes the data of the request; and
transmitting at least a portion of the request to the second storage node.

9. The non-transitory computer-readable medium of claim 8, further comprising program code that is executable by the processor for causing the processor to:
determine, based on the mapping table, the first storage node includes a first portion of the data and the second storage node includes a second portion of the data; and
transmit the first partial request to the first storage node.

10. The non-transitory computer-readable medium of claim 8, further comprising program code that is executable by the processor for causing the processor to access an updated version of the mapping table, wherein the updated version of the mapping table is generated subsequent to a predetermined event.

11. The non-transitory computer-readable medium of claim 10, wherein the predetermined event comprises an addition of a storage node or an elapsing of a predefined amount of time.

12. The non-transitory computer-readable medium of claim 8, further comprising program code that is executable by the processor for causing the processor to transmit the request to the first storage node for:
determining the first storage node includes a first portion of the data and the second storage node includes a second portion of the data;
generating, from the request, a first partial request for the first portion of the data and a second partial request for the second portion of the data; and
transmitting the second partial request to the second storage node.

13. The non-transitory computer-readable medium of claim 8, further comprising program code that is executable by the processor for causing the processor to transmit the request to the first storage node for:
subsequent to transmitting the at least a portion of the request to the second storage node, determining the second storage node includes the data of the request; and
retrieving the data in the second storage node.

14. A system comprising:
a smart network interface card (NIC) configured to:
receive a request for data at a hardware-implemented path of the smart NIC;
determine, based on a mapping table accessible by the hardware-implemented path of the smart NIC, a first storage node includes the data of the request; and
transmit the request to the first storage node;
the first storage node comprising:
a processor; and
a memory including instructions that are executable by the processor for causing the processor to:
receive the request from the smart NIC;
determine a second storage node, rather than the first storage node, includes the data; and
transmit at least a portion of the request to the second storage node.

15. The system of claim 14, wherein the smart NIC is further configured to:
determine, based on the mapping table, the first storage node includes a first portion of the data and the second storage node includes a second portion of the data; and
transmit the first partial request to the first storage node.

16. The system of claim 14, wherein the memory further includes instructions that are executable by the processor for causing the processor to:
determine, at the first storage node, the first storage node includes a first portion of the data and the second storage node includes a second portion of the data;
generate, at the first storage node and from the request, a first partial request for the first portion of the data and a second partial request for the second portion of the data; and
transmit the second partial request to the second storage node.

17. The system of claim 14, further comprising a management node comprising:
a second processor; and
a second memory including instructions that are executable by the second processor for causing the second processor to:
generate an updated version of the mapping table subsequent to a predetermined event; and
replace the mapping table accessible by the hardware-implemented path of the smart NIC with the updated version of the mapping table.

18. The system of claim 17, wherein the predetermined event comprises an addition of a storage node to the system or an elapsing of a predefined amount of time.

19. The system of claim 14, wherein the first storage node stores an association between each storage node and data stored on each storage node and the memory further includes instructions that are executable by the processor for causing the processor to automatically update the association in real time.

20. The system of claim 14, further comprising the second storage node comprising:
a third processor; and
a third memory including instructions that are executable by the third processor for causing the third processor to:
receive the at least a portion of the request from the first storage node;

determine the second storage node includes the data of the request; and retrieve the data in the second storage node.

\* \* \* \* \*